United States Patent
Kassler

(10) Patent No.: US 9,570,959 B2
(45) Date of Patent: Feb. 14, 2017

(54) ELECTRIC MOTOR WITH COOLING OF HOUSING

(71) Applicant: Helmut Kassler, Voitsberg (AT)

(72) Inventor: Helmut Kassler, Voitsberg (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 791 days.

(21) Appl. No.: 13/834,463

(22) Filed: Mar. 15, 2013

(65) Prior Publication Data

US 2014/0117796 A1   May 1, 2014

(30) Foreign Application Priority Data

Mar. 21, 2012 (DE) .................. 10 2012 102 406

(51) Int. Cl.
*H02K 9/19* (2006.01)
*H02K 5/20* (2006.01)

(52) U.S. Cl.
CPC . *H02K 9/19* (2013.01); *H02K 5/20* (2013.01)

(58) Field of Classification Search
CPC ............ H02K 5/20; H02K 9/19; H02K 9/193; H02K 5/15
USPC ....................... 310/85, 86, 402, 413, 415, 54
See application file for complete search history.

(56) References Cited

U.S. PATENT DOCUMENTS

| | | | |
|---|---|---|---|
| 2,462,451 A | | 2/1948 | Winther |
| 3,624,812 A | * | 11/1971 | Rosan et al. ................ 285/151.1 |
| 4,339,873 A | * | 7/1982 | Kanamaru et al. ............. 29/598 |
| 4,700,092 A | * | 10/1987 | Bincoletto ........................ 310/54 |
| 8,390,158 B2 | * | 3/2013 | Nakamura et al. ......... 310/68 B |
| 2002/0135245 A1 | * | 9/2002 | Derleth ..................... H02K 9/22 310/64 |
| 2004/0124720 A1 | * | 7/2004 | Condamin et al. ............. 310/51 |
| 2007/0210655 A1 | * | 9/2007 | Bahr ........................ H02K 5/20 310/54 |
| 2010/0164310 A1 | | 7/2010 | Dames et al. |
| 2011/0225806 A1 | | 9/2011 | Knight et al. |
| 2011/0234028 A1 | * | 9/2011 | Iwasaki .................... H02K 9/22 310/52 |

FOREIGN PATENT DOCUMENTS

| | | | | |
|---|---|---|---|---|
| CN | 102150350 A | | 8/2011 | |
| DE | 10019914 A1 | * | 2/2001 | ............... H02K 5/24 |
| DE | 10122425 A1 | * | 11/2002 | ............... H02K 9/02 |
| WO | WO 2006106086 A1 | * | 10/2006 | |

OTHER PUBLICATIONS

Zisler et al., Machine Translation of WO2006106086, Oct. 2006.*

(Continued)

*Primary Examiner* — Quyen Leung
*Assistant Examiner* — Eric Johnson
(74) *Attorney, Agent, or Firm* — Jordan IP Law, LLC; Todd A. Vaughn

(57) ABSTRACT

An electric motor having a housing having a front and a rear end plate, a rotor that is mounted in the end plates, a stator, the core of which stator includes stator plates that are aligned with respect to each other in the axial direction of the rotor, and a housing cooling system that includes a tube that surrounds the stator core, the being concentrically surrounded by at least one cooling channel that is open towards the tube.

17 Claims, 2 Drawing Sheets

(56) References Cited

OTHER PUBLICATIONS

Li Guoli, Chinese Patent Application No. 201310219222.8 Search Report, Jan. 23, 2015, 4 pages, Department of Electronics Inventions under Patent Examination Cooperation Hubei Center, China (English translation included).
Chinese Patent Application No. 201310219222.8 First Office Action, Feb. 2, 2015, 2 pages, State Intellectual Property Office of the People's Republic of China, Beijing, China (English translation included).

\* cited by examiner

ELECTRIC MOTOR WITH COOLING OF HOUSING

CROSS-REFERENCE TO RELATED APPLICATIONS

The present application claims priority under 35 U.S.C. §119 to German Patent Application No. 10 2012 102 406.5 (filed on Mar. 21, 2012), which is hereby incorporated by reference in its entirety.

TECHNICAL FIELD

Embodiments relate to an electric motor having a housing cooling system and comprises a housing having a front and rear end plate of which at least one is configured for removal from the housing, a rotor configured for mounting in the front and rear end plates, a stator, the core of which stator comprises stator plates aligned with respect to each other in an axial direction of the rotor, and a tube that surrounds the stator plates.

Electric motors that have a high power density, such as are used, for example, in motor vehicles, require a cooling system, at least a housing cooling system. It is necessary for cooling systems to be as light in weight as possible and to require a small amount of installation space. In addition, in order to achieve a highest possible level of efficiency, it is necessary for the air gap between the stator and the rotor to be as small as possible, which necessitates the stator being precisely centred and fixed with respect to the rotor. In order to reduce overall weight, the housings of motors of this type are mainly manufactured from light metal that has a coefficient of thermal expansion different to that of the stator plates that are embodied from iron.

BACKGROUND

An electric motor of the generic type is known from CH 337 267. The electric motor has a double-walled housing that is embodied as a welded construction. The laminated core of the stator lies against the inner wall of the housing. As a consequence, it is difficult to position and centre the stator in the housing. On account of the inner wall of the housing being a load-bearing part of the housing, the wall requires to be amply dimensioned, which impairs the transfer of heat. Overall, the housing requires a large amount of installation space.

DE 37 36 159 A1 discloses an electric motor of a plunger pump that has a vertical axis, but does not have a double-walled housing. The single housing wall is a tube that is shrunk onto the laminated core of the stator, and in one embodiment has a thicker wall thickness at both ends and is connected in each case to an end plate. The single housing wall is surrounded by the water that is to be pumped. On account of the tube being a load-bearing part of the housing, it is necessary for the thickness of the wall of the tube to be dimensioned accordingly.

SUMMARY

Embodiments are related to an electric motor configured to have a small installation space and lightweight. Embodiments combines an efficient cooling system and a simple assembly process.

In accordance with embodiments, an electric motor includes a housing cooling system and comprises a housing having a front and a rear end plate, in which at least one of the front end plate and the rear end plate is configured for removal from the housing, a rotor configured for mounting in the end plates, a stator, the core of which stator includes stator plates aligned with respect to each other in an axial direction of the rotor, and the housing cooling system comprises a tube that surrounds the stator core.

In accordance with embodiments the tube is configured to be completely surrounded by a housing having at least one cooling channel that is open towards the tube, the tube is configured to fixedly surround the stator core and at end edges thereof centred, positioned and secured in the end plates to prevent rotation.

Advantageously, by virtue of the fact that the tube is not a load-bearing part and is completely surrounded by the housing—only interrupted by the cooling channels, the tube may have a construction with thin walls.

Advantageously, by virtue of the fact the cooling channels are open towards the tube and the stator plates are fixedly retained (if the tube is shrunk on, a positive-locking connection is actually created), heat is efficiently discharged by way of the thin-walled tube whilst the outer dimensions are small. The tube provides the stator plates with a fixed hold so that the housing that surrounds the tube can also be embodied from a light metal that has a different coefficient of thermal expansion.

Advantageously, by virtue of the fact the tube at front edges thereof is centred, positioned and secured in the end plates to prevent rotation, the stator may be precisely positioned despite a simple assembly process. The tube together with the pressed-in stator plates is simply inserted into the housing and the second end plate positioned in place and fixedly screwed down, as a consequence of which the rotor is also axially fixed.

Embodiments are related to an electric motor that includes at least one of the following: a housing having a housing body, a front plate and a rear end plate, wherein at least one one of the front plate and the rear plate is configured to be removably attached to the housing body; a rotor configured for mounting in the front end plate and the rear end end plate; a stator having a stator core which comprises stator plates that are aligned with respect to each other in an axial direction of the rotor; and a cooling system configured to cool the housing, the cooling system having (i) a tube arranged concentrically with and configured to fixedly surround the stator core, the tube being centred, positioned and secured in the front end plate and the rear end plate at end edges thereof to prevent rotation; and (ii) cooling channels configured to permit a flow of a cooling medium therethrough and which surround the tube and which is open towards the tube.

Embodiments are related to an electric motor that includes at least one of the following: a housing; a front plate axially arranged at a front end of the housing; a rear end plate axially arranged at a rear end of the housing; a rotor; a stator having a stator core with a plurality of stator plates; and a cooling system configured to cool the electric motor, the cooling system having (i) a tube concentrically arranged between the housing and the stator core, and non-rotatably mounted between the front end plate and the rear end plate at end edges thereof; and (ii) at least one cooling channel concentrically arranged between the housing and the tube and configured to permit a flow of a cooling medium therethrough.

Embodiments are related to an electric motor that includes at least one of the following: a housing having a front plate and a rear end plate; a rotor; a stator; a cooling system configured to cool the electric motor, the cooling system having (i) a tube concentrically arranged between the housing and the stator, and non-rotatably mounted between the front end plate and the rear end plate at end edges thereof, and (ii) at least one cooling channel concentrically arranged between the housing and the tube and configured to permit a flow of a cooling medium therethrough; and sealing rings concentrically provided between the tube and the housing on both sides of the cooling channel In accordance with embodiments, in order to precisely position and centre the tube, the end plates may comprise shoulders that are set back and extend all around for axially positioning the tube. Teeth on the front ends of the tube are configured to engage with these shoulders of the end plates, the teeth being distributed over its circumference and extending in the axial direction. The teeth may be configured as prongs that form cutters on the front ends of the tube, and consequently, are simple to manufacture. It has proven to be particularly purposeful to embody the teeth as a micro-toothing arrangement that penetrates somewhat into the shoulders.

Advantageously, by virtue of the fact the teeth have such a structural configuration, even in the case of planar shoulders on the end plates, rotational movement is reliably prevented, and it is not necessary to provide recesses in the end plate for the teeth of the tube.

In accordance with embodiments, the teeth of the micro-toothing arrangement may have a tooth height of a maximum of 2 mm. Alternatively, the teeth of the micro-toothing arrangement may have a tooth height of a maximum of between 0.2 to 1 mm. The tooth flanks of the teeth may include an angle of between 30 and 50 degrees. Alternatively, the tooth flanks of the teeth may include an angle of 45 degrees. The spacing between the teeth may be between 5 to 20 times the tooth height. Teeth having such dimensions can be pushed into the housing, in which the greater tooth height is required for larger motors and/or a housing that is embodied from light metal.

The spacing between the teeth is dependent upon and thus determined by the overall number of teeth that are distributed over the circumference of the tube. This number is selected such that on the one hand it is sufficient for transferring the torque from the tube to the housing, and on the other hand the number is as low as possible, so that the force of the screws connecting the housing parts is sufficient for pushing in the teeth.

In accordance with embodiments, a sealing ring is provided in each case between the tube and the housing on both sides of the cooling channels.

Advantageously, by virtue of providing such a sealing ring, it is not necessary for the tube to be connected in a leak-proof manner to the housing in the area of the cooling channels. The tube can be manufactured with an interference fit, so that it can easily slide into the housing. This renders it possible to achieve a particularly thin-walled embodiment of the tube and/or a housing that is embodied from a material that has a different coefficient of thermal expansion.

DRAWINGS

Embodiments are illustrated in the drawings and are explained in more detail in the description below FIG. 1 illustrates a longitudinal view through the electric motor in accordance with embodiments.

DESCRIPTION

Figure 1:
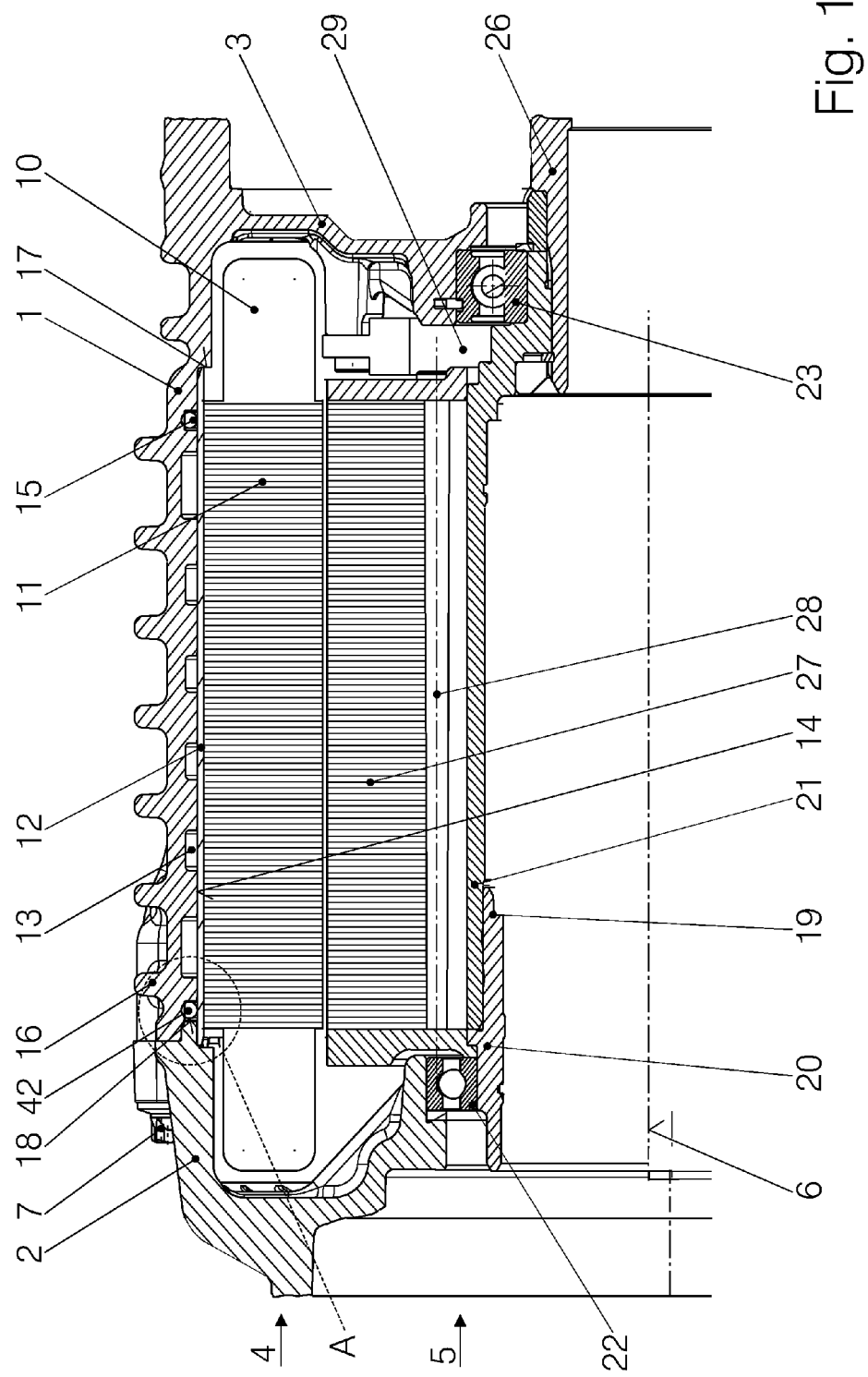

As illustrated in FIG. 1, the essentially cylindrical housing of an electric motor is designated by the numeral 1. The housing 1 is configured for connection via, for example, a threaded bolt 7, on one side to a front end plate 2 and on the other side to a rear end plate 3. Alternatively, the housing 1, the front end plate 2 and the rear end plate 3 may be configured as a single, component. The housing 1 comprises outwardly protruding cooling ribs 16. A cylindrical fit surface 14 is provided on the inner face of the housing 1, the fit surface 14 is interrupted by at least one cooling channel 13, or alternatively, a plurality of cooling channels 13 that is open towards the inner face. The cooling channel 13 can be in the form of a spiral configured to permit a flow of a cooling medium through a plurality of parallel cooling channels 13. The outer connections for supplying and discharging the cooling medium are not illustrated. A stator 4, a rotor 5 and the axis of rotation thereof is designated by the numeral 6.

The rotor 5 comprises a rotor shaft 19 and a rotor core 27, if necessary having a rotor winding that is not illustrated. The rotor shaft 19 comprises a hollow shaft that includes a front part 20 and a rear part 21, with which a driven shaft 26 is connected in a rotatably-fixed manner. The rotor core 27 comprises a plurality of stacked rotor plates that are held together by tensioning bolts 28. A commutator 29 is provided in operational connection with the rotor 5. The rotor shaft 19 is supported in the end plates 2,3 by way of bearings 22, 23 which may be configured, for example, as roller bearings.

The stator 4 comprises a stator winding 10 and a stator core 11. The stator core 11 comprises a plurality of stacked stator plates that are surrounded by a thin-walled tube 12 that is embodied from a material such as steel or the like. The tube 12 may be shrunk onto the stack of stator plates of the stator core 11. The tube 12 together with the stator core 11 is configured for insertion into the housing 1. In this case, an interference fit is sufficient because the tube 12 is sealed in the manner to be described hereinbelow with respect to the housing 1 and connected thereto in a rotatably-fixed manner.

A front O-ring 42 and a rear O-ring 42 is provided to provide a seal between the housing 1 and the tube 12 in the axial direction outside the cooling channel 13. The end edges of the tube 12 lie against a rear shoulder 17 and a front shoulder 18 in order to provide the rotatably-fixed connection to the housing 1 and/or the end plates 2, 3 and to achieve the positioning in the axial direction. The rear shoulder 17 is embodied in the housing 1, however, in the case of a removable rear end plate 3 the rear shoulder 17 could also be embodied in the removable rear end plate 3. The front shoulder 18, is embodied in the front end plate 2. In order to ensure the rotatably-fixed connection, the end edges of the tube 12 are provided with a micro-toothing arrangement 54, as is described more precisely with reference to FIGS. 2 and 3.

Figure 2:
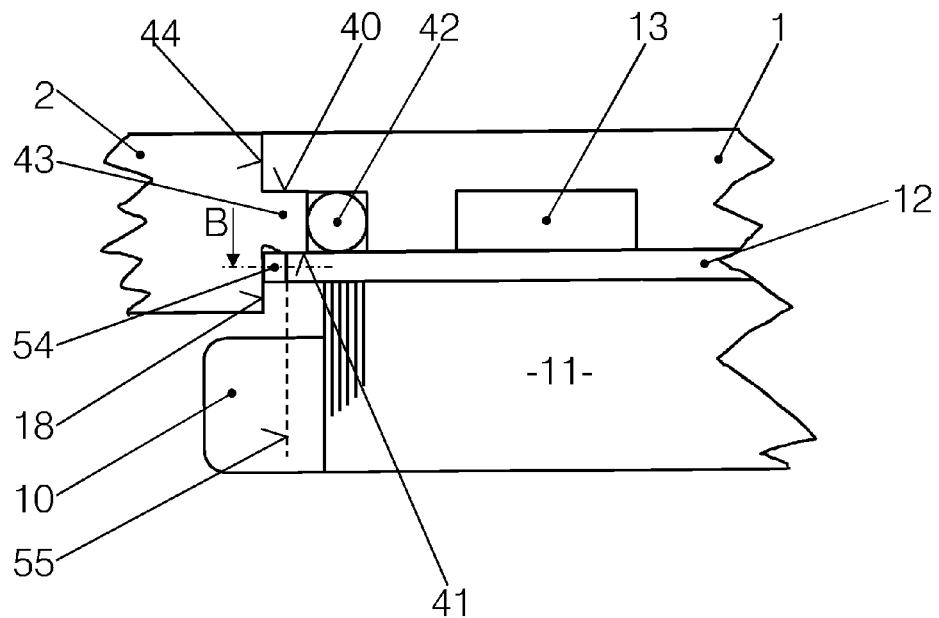
FIG. 2 illustrates an enlarged view of detail A of FIG. 1.

As illustrated in FIG. 2, the structural connection between the housing 1, the end plate 2 and the tube 12 is provided. The end plate 2 has an axis-normal fit surface 44, against which lies the housing 1, and an annular protrusion 43 that forms a pair of cylindrical centering surfaces 40, 41. The centering surface 40 corresponds to the housing 1 and the centering surface 41 corresponds to the tube 12. The micro-toothing arrangement 54 penetrates into the shoulder 18, but this is not evident in FIG. 2 on account of the depth of penetration being small. The protrusion 43 lies against the O-ring 42.

Figure 3:
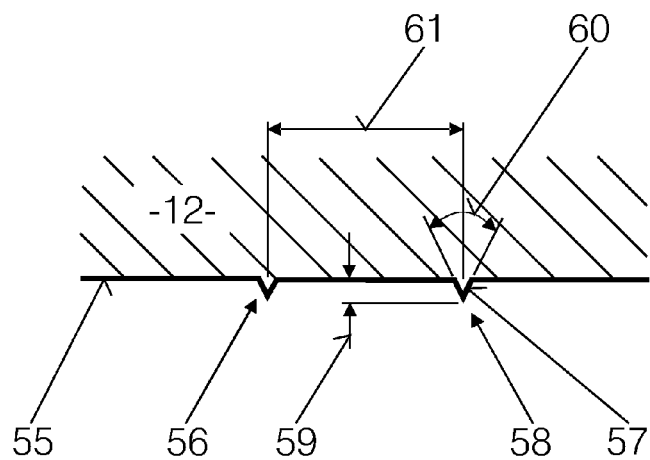
FIG. 3 illustrates a sectional view of the development B of FIG. 2.

As illustrated in FIG. 3, the structural features of the micro-toothing arrangement 54 is provided. Micro teeth 56 protrude in the axial direction from the end edge 54 of the tube 12 by the extent of the tooth height 59. The tooth height 59 amounts to a maximum of 2 mm, however, it can also be much smaller in each case depending upon the size of the motor and the material of the housing 1. The teeth 56 have tooth flanks 57 that include in each case with each other an angle 60 of 30 to 60 degrees and form a cutter 58 that slightly penetrates into the shoulder 18. The spacing 61 between the micro teeth 56 in the circumferential direction and consequently their number depends upon the reaction torque that is to be transmitted. The spacing in the illustrated exemplary embodiment amounts approximately to 10-times the tooth height 59. The other end edge of the tube 12 is provided with the identical micro-toothing arrangement.

Thus, it is also possible whilst requiring the smallest installation space and providing an efficient cooling system to achieve a simple assembly process: the tube 12 is shrunk onto the stator plates that form the stator core 11 and then is pushed into the housing 1 that is provided with the O-rings 15,42. Finally, the end plate 2 is placed in position, in which the micro teeth penetrate into their respective shoulders 17, 18.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE SIGNS

1 Housing
2 Front end plate
3 Rear end plate in one piece with 1
4 Stator
5 Rotor
6 Axis of rotation
7 Threaded bolt
10 Stator winding
11 Stator core
12 Tube
13 Cooling channel
14 Load-bearing part of 1
15 O-ring
16 Cooling ribs
17 Rear shoulder in 1
18 Front shoulder, cf. FIG. 2 for more detail
19 Rotor shaft
20 Rotor shaft front part
21 Rotor shaft rear part
22 Front bearing in 2
23 Rear bearing in 3
24 Sealing ring
25 Sealing ring
26 Driven shaft
27 Rotor core
28 Tensioning bolt
29 Optional commutator
40 First centring surface between 1 and 2
49 Second centring surface between 2 and 12
42 O-ring
43 Protrusion
44 End edge
54 Micro-toothing arrangement
55 End edge of 12
56 Micro tooth
57 Tooth flank
58 Cutter
59 Tooth height
60 Flank angle
61 Tooth spacing

What is claimed is:

1. An electric motor comprising:
a housing having a housing body, a front plate and a rear end plate, wherein at least one of the front plate and the rear plate is configured to be removably attached to the housing body, the housing body having a fit surface provided on an inner face thereof;
a rotor configured for mounting in the front end plate and the rear end plate;
a stator having a stator core which comprises stator plates that are aligned with respect to each other in an axial direction of the rotor; and
a cooling system configured to cool the housing, the cooling system having:
a tube arranged concentrically with and configured to fixedly surround the stator core, the tube being centered, positioned and secured in the front end plate and the rear end plate at end edges thereof to prevent rotation, wherein the end edges have teeth protruding axially to engage into the front end plate and the rear end plate; and
cooling channels defined by contact of the tube with the fit surface of the housing body, and which is configured to permit a flow of a cooling medium therethrough, the cooling channels being configured to surround the tube and open towards the tube.

2. The electric motor of claim 1, wherein the front end plate and the rear end plate each comprise shoulders configured to axially position the tube.

3. The electric motor of claim 1, wherein the teeth are circumferentially distributed and extend in an axial direction.

4. The electric motor of claim 3, wherein the teeth comprise a micro-toothing arrangement.

5. The electric motor of claim 4, wherein the micro-toothing arrangement have:
a maximum tooth height of 2 mm;
tooth flanks with a flank angle of between 30 and 50 degrees; and
spacing between the teeth are 5 to 20 times the tooth height.

6. The electric motor of claim 4, wherein the micro-toothing arrangement have:
a maximum tooth height of between 0.2 to 1 mm;
tooth flanks with a flank angle of approximately 45 degrees; and
spacing between the teeth are 5 to 20 times the tooth height.

7. The electric motor of claim 1, further comprising a front sealing ring and a rear sealing ring concentrically provided between the tube and the housing on both sides of the cooling channel.

8. The electric motor of claim 1, wherein the tube has a thin wall thickness.

9. An electric motor comprising:
- a housing having a fit surface provided on an inner face thereof;
- a front plate axially at a front end of the housing;
- a rear end plate axially arranged at a rear end of the housing;
- a rotor;
- a stator having a stator core with a plurality of stator plates; and
- a cooling system configured to cool the electric motor, the cooling system having:
  - a tube concentrically arranged between the housing and the stator core, and non-rotatable mounted between the front end plate and the rear end plate at end edges thereof, wherein the end edges have teeth protruding axially to engage into the front end plate and the rear end plate; and
  - at least one cooling channel concentrically arranged between the housing and the tube, and defined by contact of the tube with the fit surface of the housing, the at least one cooling channel being configured to permit a flow of a cooling medium therethrough.

10. The electric motor of claim 9, wherein the front end plate and the rear end plate each comprise shoulders configured to axially position the tube.

11. The electric motor of claim 9, wherein the teeth are circumferentially distributed and extend in an axial direction.

12. The electric motor of claim 11, wherein the teeth comprise a micro-toothing arrangement.

13. The electric motor of claim 12, wherein the micro-toothing arrangement have:
- a maximum tooth height of 2 mm;
- tooth flanks with a flank angle of between 30 and 50 degrees; and
- spacing between the teeth are 5 to 20 times the tooth height.

14. The electric motor of claim 12, wherein the micro-toothing arrangement have:
- a maximum tooth height of between 0.2 to 1 mm;
- tooth flanks with a flank angle of approximately 45 degrees; and
- spacing between the teeth are 5 to 20 times the tooth height.

15. The electric motor of claim 9, further comprising a front sealing ring and a rear sealing ring concentrically provided between the tube and the housing on both sides of the cooling channel.

16. The electric motor of claim 9, wherein the tube has a thin wall thickness.

17. An electric motor comprising:
- a housing having a fit surface provided on an inner face thereof, a front plate and a rear end plate;
- a rotor;
- a stator;
- a cooling system configured to cool the electric motor, the cooling system having:
  - a tube concentrically arranged between the housing and the stator, and non-rotatably mounted between the front end plate and the rear end plate at end edges thereof, wherein the end edges have teeth protruding axially to engage into the front end plate and the rear end plate; and
  - at least one cooling channel concentrically arranged between the housing and the tube and defined by contact of the tube with the fit surface of the housing, the at least one cooling channel being configured to permit a flow of a cooling medium therethrough;
- sealing rings concentrically provided between the tube and the housing on both sides of the cooling channel.

* * * * *